United States Patent
Mou et al.

(10) Patent No.: US 12,434,183 B2
(45) Date of Patent: Oct. 7, 2025

(54) AIR POLLUTION PREVENTION SYSTEM

(71) Applicant: Microjet Technology Co., Ltd., Hsinchu (TW)

(72) Inventors: Hao-Jan Mou, Hsinchu (TW); Yung-Lung Han, Hsinchu (TW); Chi-Feng Huang, Hsinchu (TW); Chin-Chuan Wu, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 388 days.

(21) Appl. No.: 18/114,442

(22) Filed: Feb. 27, 2023

(65) Prior Publication Data

US 2024/0019161 A1    Jan. 18, 2024

(30) Foreign Application Priority Data

Mar. 4, 2022    (TW) ................................. 111108049

(51) Int. Cl.
*B01D 46/46* (2006.01)
*A45D 20/00* (2006.01)
(Continued)

(52) U.S. Cl.
CPC ............. *B01D 46/46* (2013.01); *A45D 20/00* (2013.01); *A47J 36/38* (2013.01); *A47L 9/12* (2013.01);
(Continued)

(58) Field of Classification Search
None
See application file for complete search history.

(56) References Cited

U.S. PATENT DOCUMENTS 10,928,371 B1 *   2/2021   Smith ................ G01N 15/0606
2009/0049808 A1 * 2/2009   Kawaguchi ............ B01D 46/04
                                                                55/304
(Continued)

FOREIGN PATENT DOCUMENTS

CN      107991933 A   *   5/2018
EP        3346268 A1  *   7/2018   ......... G01N 33/0004
(Continued)

OTHER PUBLICATIONS

EP3346268A1_ENG (Espacenet machine translation of Delacroix) (Year: 2018).*
(Continued)

*Primary Examiner* — Gabriel E Gitman
(74) *Attorney, Agent, or Firm* — Birch, Stewart, Kolasch & Birch, LLP

(57) ABSTRACT

An air pollution prevention system is disclosed and includes at least one detection and processing device and at least one cleaning device. The detection and processing device includes a nano actuator, a nano photodetector, a carbon nanotube and a microprocessor, which are integrated as a single chip device through semiconductor manufacturing processes. The detection and processing device configured to detect a particulate matter and gas contained in an air pollution source and output a control command. The cleaning device includes a nano blower, a nano filter and a controller. The cleaning device receives the control command outputted from the detection and processing device through the controller to control the nano blower for guiding the air pollution source to flow through the nano filter for filtration.

17 Claims, 2 Drawing Sheets

(51) Int. Cl.

| | |
|---|---|
| *A47J 36/38* | (2006.01) |
| *A47L 9/12* | (2006.01) |
| *A47L 9/28* | (2006.01) |
| *B01D 39/20* | (2006.01) |
| *B01D 46/00* | (2022.01) |
| *B01D 46/44* | (2006.01) |
| *B01D 46/54* | (2006.01) |
| *F24F 8/108* | (2021.01) |
| *F24F 8/158* | (2021.01) |
| *F24F 11/63* | (2018.01) |
| *F24F 11/89* | (2018.01) |
| *G01N 27/00* | (2006.01) |
| *F24C 15/20* | (2006.01) |
| *F24F 8/80* | (2021.01) |
| *F24F 110/65* | (2018.01) |
| *G01N 15/0205* | (2024.01) |
| *G01N 15/06* | (2006.01) |

(52) U.S. Cl.
CPC ........... *A47L 9/2815* (2013.01); *A47L 9/2842* (2013.01); *B01D 39/2055* (2013.01); *B01D 46/0028* (2013.01); *B01D 46/442* (2013.01); *B01D 46/543* (2013.01); *F24F 8/108* (2021.01); *F24F 8/158* (2021.01); *F24F 11/63* (2018.01); *F24F 11/89* (2018.01); *G01N 27/00* (2013.01); *B01D 2279/50* (2013.01); *B01D 2279/65* (2013.01); *F24C 15/2042* (2013.01); *F24F 8/80* (2021.01); *F24F 2110/65* (2018.01); *G01N 15/0205* (2013.01); *G01N 15/06* (2013.01)

(56) References Cited

U.S. PATENT DOCUMENTS

| | | | |
|---|---|---|---|
| 2020/0038783 A1* | 2/2020 | Kleinguetl | E21B 21/063 |
| 2021/0247083 A1* | 8/2021 | Mou | F24F 8/167 |
| 2021/0409286 A1* | 12/2021 | Lee | H04L 41/16 |
| 2023/0151958 A1* | 5/2023 | Okagaki | F24F 13/20 |

FOREIGN PATENT DOCUMENTS

| | | |
|---|---|---|
| TW | 201910689 A | 3/2019 |
| TW | 202026620 A | 7/2020 |
| TW | 202130401 A | 8/2021 |

OTHER PUBLICATIONS

CN107991933A_ENG (Espacenet machine translation of Zhang) (Year: 2018).*

* cited by examiner

AIR POLLUTION PREVENTION SYSTEM

CROSS-REFERENCE TO RELATED APPLICATION

This application claims priority to Taiwan Patent Application No. 111108049, filed on Mar. 4, 2022. The entire contents of the above-mentioned patent application are incorporated herein by reference for all purposes.

FIELD OF THE INVENTION

The present disclosure relates to a system for detecting air pollution, and more particularly to an air pollution prevention system capable of detecting and filtering the tiniest air pollution sources.

BACKGROUND OF THE INVENTION

In recent years, people pay more and more attention to the air quality around their living environment. Particulate matter (PM), such as PM1, PM2.5 and PM10, carbon monoxide, carbon dioxide, total volatile organic compounds (TVOC), formaldehyde and even suspended particles, aerosols, bacteria and viruses contained in the air and exposed in the environment might affect human health, and even endanger people's life.

However, it is not easy to control the indoor air quality. In addition to the air quality of the outdoor space, the air environmental conditions and pollution sources, especially the dusts, the bacteria and the viruses originated from poor air circulation in the indoor space, are the major factors that affect indoor air quality.

Therefore, in order to provide a purification solution for detecting the indoor air quality in real time and reducing the harmful gases breathed indoors, how to utilize the nano-level detection and processing device and the purification device having the nano filter to monitor the indoor air quality anytime, anywhere through the artificial intelligence of things (AIoT) for achieving the cleanliness of the tiniest air pollution source and approaching the zero-air-pollution prevention has been the main subject of the present disclosure.

SUMMARY OF THE INVENTION

One object of the present disclosure is to provide an air pollution prevention system. The tiniest air pollution sources are detected through the nano-level detection and processing device for monitoring the status of environmental air quality in real time. Moreover, the cleaning device having the nano filter is linked and actuated through the intelligent internet of things (AIoT) for filtering the tiniest pollution sources through the cleaning device having the nano filter. Thus, the cleanliness of the tiniest air pollution source is achieved and the zero-air-pollution prevention pollution is approached.

In accordance with an aspect of the present disclosure, an air pollution prevention system is provided and includes at least one detection and processing device and at least one cleaning device. The at least one detection and processing device includes a nano actuator, a nano photodetector, a carbon nanotube and a microprocessor, which are integrated as a single chip device through semiconductor manufacturing processes and configured to detect a particulate matter and gas contained in an air pollution source and output a control command. The at least one cleaning device includes a nano blower, a nano filter and a controller. The cleaning device receives the control command outputted from the detection and processing device through the controller to control the nano blower, so that the nano blower is enabled and controlled to guide the air pollution source to flow through the nano filter for filtration.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
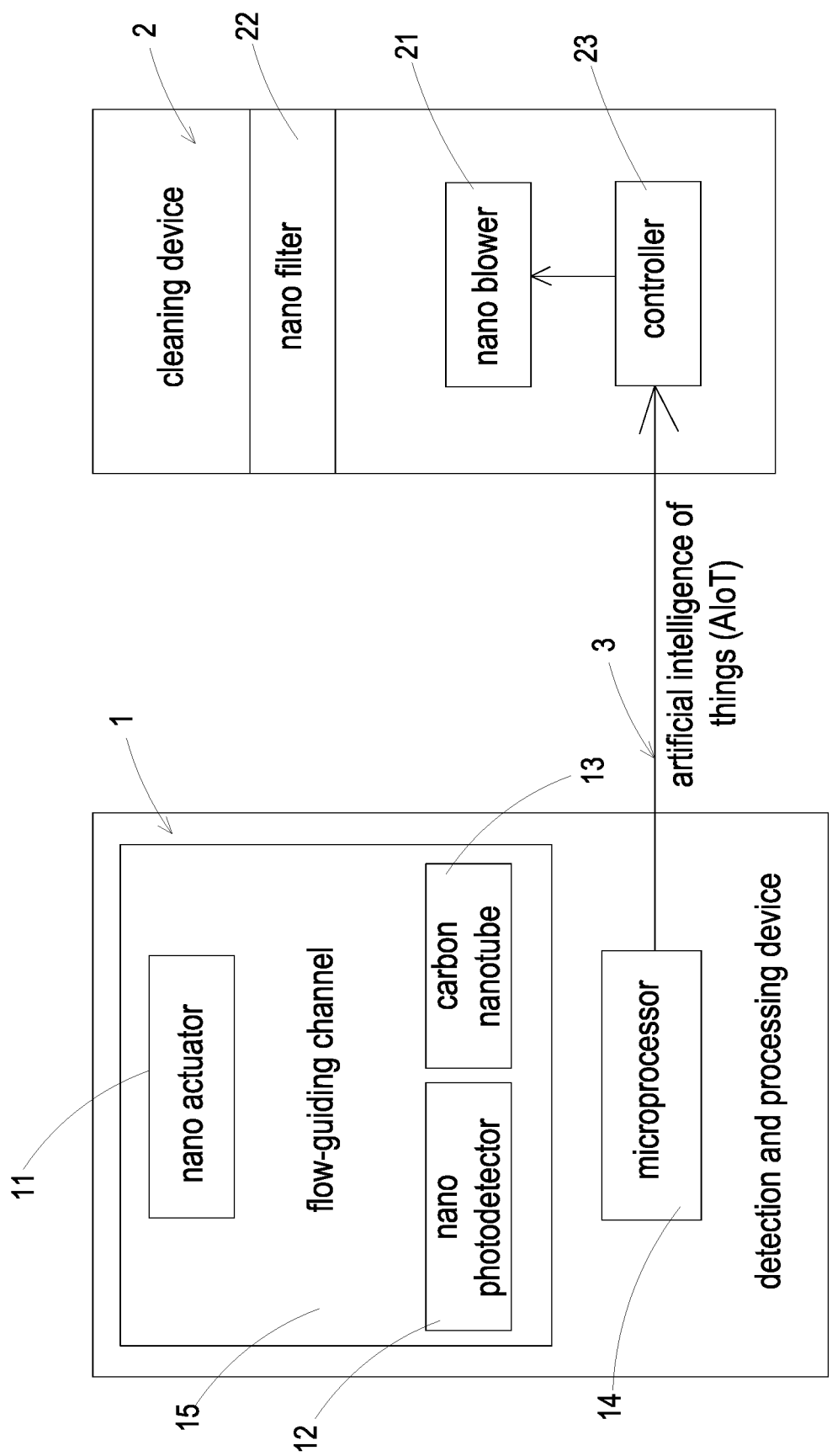
FIG. 1 is a block diagram showing an air pollution prevention system according to an embodiment of the present disclosure.

Referring to FIG. 1, the present disclosure provides an air pollution prevention system including: at least one detection and processing device 1 and at least one cleaning device 2. The detection and processing device 1 includes a nano actuator 11, a nano photodetector 12, a carbon nanotube 13 and a microprocessor 14, which are integrated as a single chip device through semiconductor manufacturing processes and configured to detect a particulate matter and gas contained in an air pollution source and output a control command. The cleaning device 2 includes a nano blower 21, a nano filter 22 and a controller 23. The cleaning device 2 receives the control command outputted from the detection and processing device 1 through the controller 23 to control the nano blower 21, so that the nano blower 21 is enabled and controlled to guide the air pollution source to flow through the nano filter 22 for filtration.

In the embodiment, the detection and processing device 1 further includes a flow-guiding channel 15. Preferably but not exclusively, the nano actuator 11 is disposed in the flow-guiding channel 15 to guide the air pollution source to enter, and one end of the flow-guiding channel 15 is connected to the nano photodetector 12 and the carbon nanotubes 13. Thereby, the particulate matter contained in the air pollution source is detected by the nano photodetector 12, and the gas contained in the air pollution source is detected by the carbon nanotubes 13. Notably, in the embodiment, the particulate matter (PM) includes PM1, PM2.5 and PM10. In the embodiment, the gas is at least one selected from the group consisting of carbon monoxide, carbon dioxide, ozone, sulfur dioxide, nitrogen dioxide, lead, total volatile organic compounds (TVOC), formaldehyde, bacteria, fungi, virus and a combination thereof.

Figure 2:
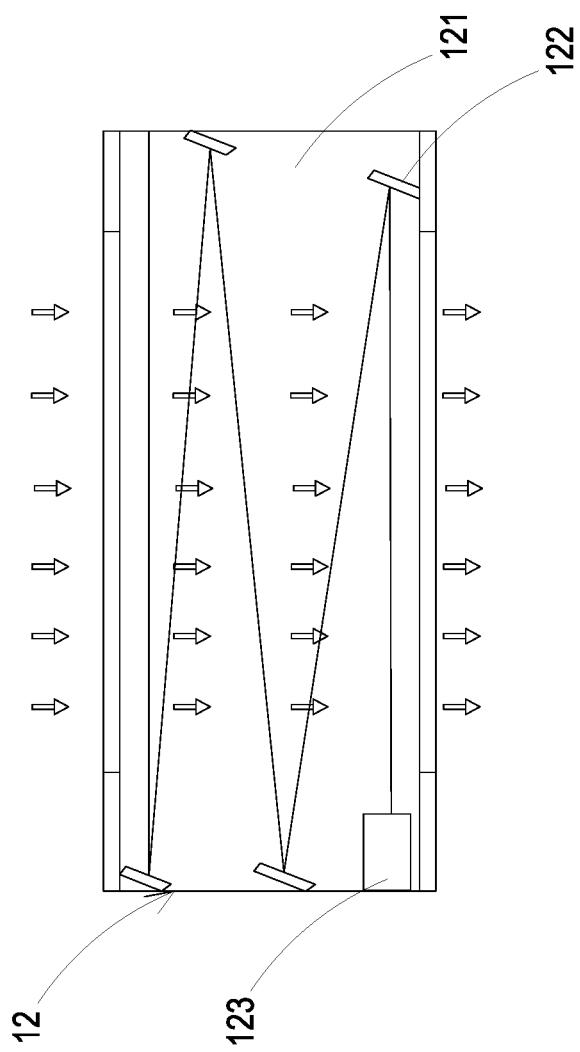
FIG. 2 is a schematic view illustrating the nano photodetector of the air pollution prevention system according to the embodiment of the present disclosure.

As shown in FIG. 2, the nano photodetector 12 is formed by disposing a nano array mirror 122 and a nano light source 123 in a chamber 121. When the air pollution source is guided into the flow channel 15 by the nano actuator 11 and flows into the chamber 121 of the nano photodetector 12, a light source is emitted from the nano light source 123, and the light source is reflected through the nano array mirror 122, thereby the particulate matter contained in the air pollution source is irradiated by the light source, also, the size and concentration of the particulate matter contained in the air pollution source are detected and calculated by the nano photodetector 12. Thus, data output of the of the particulate matter is detected through the nano photodetector 12.

Preferably but not exclusively, in the embodiment, the carbon nanotube 13 is a gas detector formed by carbon nanotubes. An array of carbon nanotubes on a silicon dioxide substrate are used in the gas detector. Each carbon nanotube has a tip radius of 15 nm. A distance formed between each adjacent two carbon nanotubes is 50 nm. An electrode made of aluminum is disposed above the carbon nanotubes with the spaced distance of 150 μm to generate an electric field, so that the gas molecules are dissociated to conduct the circuit. Different gas molecules have different breakdown voltages. It allows to distinguish the type of gas molecules through the different breakdown voltages. In addition, there is a good exponential relationship between the current and the gas concentration. Therefore, it allows to quantify the measured gas in accordance with the current, so as to know the type of gas and detect data output of the tiniest gas contained in the air pollution source.

In the embodiment, the data outputs of the particulate matter and the gas are analyzed and calculated by the microprocessor 14, and the control command is outputted through an artificial intelligence of things (AIoT) 3. Notably, in the embodiment, the AIoT 3 allows the microprocessor 14 using artificial intelligence algorithms to collect the data outputs of the particulate matter and the gas, and outputting the control command in accordance with the collected data outputs of the particulate matter and the gas through the wireless transmission network.

Notably, in the embodiment, the cleaning device 2 is disposed indoors and includes for example but not limited to a fresh air fan, a purifier, an air conditioner, a range hood, an exhaust fan, a hairdryer, an electric fan or a vacuum cleaner. Preferably but not exclusively, the nano blower 21 of the cleaning device 2 is made of nano particle powders and has a fine surface area, thereby it has advantages of reducing the energy loss of static friction and dynamic friction during rotation, thereby improving the efficiency of air-guiding volume of the nano blower 21. Preferably but not exclusively, in the embodiment, the nano filter 22 of the cleaning device 2 includes a nanofiber, a nano activated carbon, or a nano film. Generally speaking, the nanofiber is made of hollow-fiber membranes, which can remove harmful substances such as bacteria and heavy metal ions. The nano activated carbon is made by combining the carbon nanotube material and the high-efficiency particle filter through the nanofabrication process, so as to filter dust, particles and bacteria. Usually, the high-efficiency particulate filter includes random chemical fibers. Preferably but not exclusively, the high-efficiency particulate filter is made of the non-woven fabric of polypropylene fiber or polyester fiber or the glass fiber, and has the floc structure with a diameter ranged from 0.5 μm to 2.0 μm for removing particles. In addition, the nano activated carbon can be made by spraying, dipping, and coating to attach antiviral agents to the surface for inhibiting influenza virus or enterovirus. Preferably but not exclusively, the nano film includes nano-microporous polytetrafluoroethylene (PTFE) membranes, which can filter particles ranged from 0.1 μm to 2.5 μm. Since the pore size of nano-microporous polytetrafluoroethylene (PTFE) membranes is smaller than that of ordinary microporous membranes, the filtration rate of the nano-microporous polytetrafluoroethylene (PTFE) membranes is as high as 99.9%. Thus, the nano-microporous polytetrafluoroethylene (PTFE) membranes are capable of excluding viruses, allergens and fine particles, and have extremely good filtration characteristics.

In the embodiment, the controller 23 receives the control command output by the detection and processing device 1, and intelligently compare the data outputs of the particulate matter and the gas with a safety data value. The data outputs of the particulate matter and the gas are analyzed and calculated by the microprocessor 14. In case of that the data outputs are inferior to the safety data value, the microprocessor 14 outputs the control command through the AIoT 3, the control command is received by the controller 23 of the cleaning device 2, and then the controller 23 intelligently compares the data outputs of the particulate matter and the gas with the safety data value in order to control actuation operation of the nano blower 21 and adjust air-guiding volume of the nano blower 21. Notably, in the embodiment, the safety detection value may also include at least one selected from the group consisting of a concentration of PM2.5 which is less than 35 $\mu g/m^3$, a concentration of carbon dioxide which is less than 1000 ppm, a concentration of total volatile organic compounds which is less than 0.56 ppm, a concentration of formaldehyde which is less than 0.08 ppm, a colony-forming unit of bacteria which is less than 1500 $CFU/m^3$, a colony-forming unit of fungi which is less than 1000 $CFU/m^3$, a concentration of sulfur dioxide which is less than 0.075 ppm, a concentration of nitrogen dioxide which is less than 0.1 ppm, a concentration of carbon monoxide which is less than 9 ppm, a concentration of ozone which is less than 0.06 ppm, a concentration of lead which is less than 0.15 $\mu g/m^3$ and a combination thereof. In addition, it is worth noting that, in accordance with the control command issued from the microprocessor 14, the nano blower 21 of the cleaning device 2 can change the air-guiding volume with the change of the air pollution quality. For example: when the air pollution quality is worse than the safety data value, the air-guiding volume is larger. When the air pollution quality is closer to the safety data value, the air-guiding volume is smaller. When the air pollution quality is better than the safety data value, the nano blower 21 can be turned off.

In summary, the present disclosure provides an air pollution prevention system, the tiniest air pollution sources are detected through the nano-level detection and processing device for monitoring the status of environmental air quality in real time. Moreover, the cleaning device having the nano filter is linked and actuated through the intelligent internet of things (AIoT) for filtering the tiniest pollution sources through the cleaning device having the nano filter. Thus, the cleanliness of the tiniest air pollution source is achieved and the zero-air-pollution prevention pollution is approached, accordingly, the present disclosure demonstrates the high industrial applicability with the inventive steps.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An air pollution prevention system, comprising:
   at least one detection and processing device comprising a nano actuator, a nano photodetector, a carbon nanotube and a microprocessor, which are integrated as a single chip device through semiconductor manufacturing processes and configured to detect a particulate matter and gas contained in an air pollution source and output a control command; and
   at least one cleaning device comprising a nano blower, a nano filter and a controller, wherein the cleaning device receives the at least one control command outputted from the at least one detection and processing device through the controller to control the nano blower, so that the nano blower is enabled and controlled to guide the air pollution source to flow through the nano filter for filtration.

2. The air pollution prevention system according to claim 1, wherein the gas is at least one selected from the group consisting of carbon monoxide, carbon dioxide, ozone, sulfur dioxide, nitrogen dioxide, lead, total volatile organic compounds (TVOC), formaldehyde, bacteria, fungi, virus and a combination thereof.

3. The air pollution prevention system according to claim 1, wherein the nano photodetector is formed by disposing a nano array mirror and a nano light source in a chamber.

4. The air pollution prevention system according to claim 1, wherein the at least one detection and processing device comprises a flow-guiding channel, the nano actuator is disposed in the flow-guiding channel to guide the air pollution source to enter, and one end of the flow-guiding channel is connected to the nano photodetector and the carbon nanotube, so that the particulate matter contained in the air pollution source is detected by the nano photodetector, the gas contained in the air pollution source is detected by the carbon nanotube, data outputs of the particulate matter and the gas are analyzed and calculated by the microprocessor, and the control command is outputted through an artificial intelligence of things (AIoT).

5. The air pollution prevention system according to claim 1, wherein the controller receives the control command outputted by the at least one detection and processing device, and intelligently compares data outputs of the particulate matter and the gas to control an actuation operation of the nano blower and adjust an air-guiding volume of the nano blower.

6. The air pollution prevention system according to claim 1, wherein the nano blower is made of nano particle powders.

7. The air pollution prevention system according to claim 1, wherein the nano filter comprises a nanofiber.

8. The air pollution prevention system according to claim 1, wherein the nano filter comprises a nano activated carbon.

9. The air pollution prevention system according to claim 1, wherein the nano filter comprises a nano film.

10. The air pollution prevention system according to claim 1, wherein the at least one cleaning device comprises a fresh air fan.

11. The air pollution prevention system according to claim 1, wherein the at least one cleaning device comprises a purifier.

12. The air pollution prevention system according to claim 1, wherein the at least one cleaning device comprises an air conditioner.

13. The air pollution prevention system according to claim 1, wherein the at least one cleaning device comprises a range hood.

14. The air pollution prevention system according to claim 1, wherein the at least one cleaning device comprises an exhaust fan.

15. The air pollution prevention system according to claim 1, wherein the at least one cleaning device comprises a hairdryer.

16. The air pollution prevention system according to claim 1, wherein the at least one cleaning device comprises an electric fan.

17. The air pollution prevention system according to claim 1, wherein the cleaning device comprises a vacuum cleaner.

* * * * *